(12) United States Patent
Carr (10) Patent No.: US 7,583,390 B2
(45) Date of Patent: *Sep. 1, 2009

(54) ACCELEROMETER COMPRISING AN OPTICALLY RESONANT CAVITY

(75) Inventor: Dustin Wade Carr, Albuquerque, NM (US)

(73) Assignee: Symphony Acoustics, Inc., Rio Rancho, NM (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/051,647

(22) Filed: Mar. 19, 2008

(65) Prior Publication Data

US 2008/0163686 A1 Jul. 10, 2008

Related U.S. Application Data

(63) Continuation-in-part of application No. 11/366,730, filed on Mar. 2, 2006, now Pat. No. 7,355,723.

(51) Int. Cl.
*G01B 9/02* (2006.01)
*G01L 1/24* (2006.01)

(52) U.S. Cl. ..................... 356/519; 356/35.5

(58) Field of Classification Search ............... 356/35.5, 356/454, 480, 519; 250/227.19, 227.27; 359/578

See application file for complete search history.

(56) References Cited

U.S. PATENT DOCUMENTS

| | | | |
|---|---|---|---|
| 4,983,824 A | 1/1991 | Saaski et al. | |
| 5,128,537 A | 7/1992 | Haelg | |
| 5,218,420 A * | 6/1993 | Asmar | 356/480 |
| 5,589,689 A | 12/1996 | Koskinen | |
| 5,831,262 A | 11/1998 | Greywall et al. | |
| 5,832,157 A * | 11/1998 | Berthold et al. | 385/51 |
| 5,909,280 A | 6/1999 | Zavracky | |
| 5,986,759 A * | 11/1999 | DeCain et al. | 356/519 |
| 6,163,380 A | 12/2000 | Hays | |
| 6,281,976 B1 * | 8/2001 | Taylor et al. | 356/480 |
| 6,321,010 B1 | 11/2001 | Walker et al. | |
| 6,473,713 B1 * | 10/2002 | McCall et al. | 702/141 |
| 6,483,619 B1 | 11/2002 | Greywall | |
| 6,563,593 B2 | 5/2003 | Hill | |
| 6,567,572 B2 | 5/2003 | Degertekin et al. | |
| 7,042,579 B2 * | 5/2006 | North Morris | 356/519 |
| 7,043,102 B2 | 5/2006 | Okamoto et al. | |

(Continued)

FOREIGN PATENT DOCUMENTS

GB 1243359 8/1971

OTHER PUBLICATIONS

Office Action from U.S. Appl. No. 11/366,730 dated Nov. 28, 2007.

(Continued)

*Primary Examiner*—Michael A Lyons
(74) *Attorney, Agent, or Firm*—DeMont & Breyer, LLC (57) ABSTRACT

An accelerometer based on an optical displacement sensor is disclosed. An embodiment of the present invention directs a light beam toward an optically resonant cavity and detects both the reflected and transmitted optical beams that result from interaction with the optically resonant cavity. The optically resonant cavity has a cavity length that is based on the position of a proof mass that moves in response to an acceleration.

19 Claims, 7 Drawing Sheets

U.S. PATENT DOCUMENTS

| | | | |
|---|---|---|---|
| 7,164,479 | B2 | 1/2007 | Johansen et al. |
| 7,355,723 | B2 * | 4/2008 | Carr .......................... 356/519 |
| 7,359,067 | B2 * | 4/2008 | Carr .......................... 356/519 |
| 7,495,775 | B2 * | 2/2009 | Carr .......................... 356/519 |
| 2003/0038949 | A1 | 2/2003 | Degertekin et al. |
| 2004/0099799 | A1 | 5/2004 | Shinzou |
| 2004/0130728 | A1 | 7/2004 | Degertekin et al. |
| 2005/0018541 | A1 | 1/2005 | Johansen et al. |
| 2005/0105098 | A1 | 5/2005 | Johansen et al. |
| 2005/0231729 | A1 | 10/2005 | Lopushansky et al. |

OTHER PUBLICATIONS

Sagberg et al., "Optical Microphone Based on a Modulated Diffractive Lens", "IEEE Photonics Technology Letters", Oct. 2003, pp. 1431-1433, vol. 15, No. 10.

Kokkonen, Jukka, "International Application No. PCT/US2007/061633 International Preliminary Report on Patentability", Jun. 27, 2008, Publisher: PCT, Published in: EP.

Kokkonen, Jukka, "International Application No. PCT/US2007/061633 Search Report", Jun. 4, 2007, Publisher: PCT, Published in: EP.

Lyons, Michael A, "U.S. Appl. No. 11/366,730 Allowance", Jan. 17, 2008, Publisher: USPTO, Published in: US.

Lyons, Michael A, "U.S. Appl. No. 11/366,730 Office Action", Nov. 28, 2007, Publisher: USPTO, Published in: US.

Lyons, Michael A., "U.S. Appl. No. 12/122,342 Notice of Allowance", Apr. 6, 2009, Publisher: USPTO, Published in: US.

Brandt, Isabelle, "International Application No. PCT/US2007/064703 International Preliminary Report on Patentability", Jul. 18, 2008, Publisher: EPO, Published in: EP.

Brandt, Isabelle, "International Application No. PCT/US2007/064703 Search Report", Sep. 18, 2007, Publisher: EPO, Published in: EP.

Lyons, Michael A, "U.S. Appl. No. 11/278,990 Notice of Allowance", Jan. 17, 2008, Publisher: USPTO, Published in: US.

Lyons, Michael A, "U.S. Appl. No. 11/278,990 Office Action", Nov. 28, 2007, Publisher: USPTO, Published in: US.

Lyons, Michael A, "U.S. Appl. No. 12/030,033 Notice of Allowance", Nov. 14, 2008, Publisher: USPTO, Published in: US.

Lyons, Michael A, "U.S. Appl. No. 12/030,033 Office Action", Jul. 21, 2008, Publisher: USPTO, Published in: US.

* cited by examiner

ACCELEROMETER COMPRISING AN OPTICALLY RESONANT CAVITY

CROSS REFERENCE TO RELATED APPLICATIONS

This case is a continuation-in-part of co-pending U.S. patent application Ser. No. 11/366,730 filed Mar. 2, 2006, which is incorporated by reference herein.

FIELD OF THE INVENTION

The present invention relates to displacement sensors in general, and, more particularly, to accelerometers.

BACKGROUND OF THE INVENTION

Displacement sensors, such as microphones and pressure sensors, are well-known. Displacement sensors based on capacitive, impedance, and optical measurements have been developed. Optical displacement sensors are particularly attractive as they overcome many of the limitations of capacitive and impedance measurement techniques, such as low sensitivity, the need for high voltage biasing, poor electrical isolation, or response nonlinearities.

Many optical displacement sensors known in the prior art operate by detecting light reflected by an optical element that changes its reflectivity in response to a pressure differential, sound, vibration, etc. A Fabry-Perot interferometer has often been used as such an optical element. A Fabry-Perot interferometer has an optically resonant cavity whose reflectivity depends on the spacing between two parallel partially-reflective surfaces. In order to form a Fabry-Perot interferometer that is sensitive to sound, etc., one surface of the optically resonant cavity is a movable surface. When the movable surface moves in response to an environmental stimulus, the reflectivity of the cavity is changed. The intensity of the detected light changes as well, therefore, thereby resulting in an electrical signal based on the incident acoustic energy of the sound.

The dynamic range of the reflectivity change of the Fabry-Perot interferometer limits the sensitivity of prior art microphones. In addition, noise in the detected signal, such as detector noise or source noise, reduces the fidelity of prior art optical microphones, since detector and/or source noise can be difficult to distinguish from a reflectivity change of the Fabry-Perot interferometer. The ratio of signal strength to noise (i.e., the signal-to-noise ratio (SNR)) is a key performance metric for displacement sensor performance. When used as a hearing aid microphone, for example, low SNR impairs the ability to provide clear high-fidelity reproduction of the sound desired by the hearing aid user. It also impairs the ability to improve hearing aid performance through signal processing techniques.

There exists, therefore, a need for an optical displacement sensor that overcomes some of the limitations of the prior art.

SUMMARY OF THE INVENTION

The present invention enables the optical detection of an acceleration without some of the costs and disadvantages for doing so in the prior art. For example, embodiments of the present invention are particularly well-suited for use in accelerometer and gravimeter applications.

The embodiments described herein are specific embodiments of the generic displacement sensor described in co-pending U.S. patent application Ser. No. 11/366,730 filed Mar. 2, 2006, which is incorporated by reference herein. In the parent case, a displacement sensor suitable for sensing an environmental stimulus was disclosed. Examples of specific applications for which the displacement sensor is particularly well-suited were also disclosed. These included microphone, high-sensitivity pressure sensor, vibration sensor, and accelerometer applications. The instant application provides detailed embodiments that are directed toward acceleration and/or gravity sensor applications, in particular.

Embodiments of the present invention, like the prior art, use a movable membrane to provide one surface of an optically-resonant cavity. Unlike the prior art, however, some embodiments of the present invention detect both the reflected beam AND the transmitted beam (i.e., the optical beam that transits the optically-resonant cavity) from the optically resonant cavity. In addition, some embodiments of the present invention also form a composite output signal from the two detected beams.

In the prior art, only the reflected beam from an optically resonant cavity is detected and used to generate the electrical output signal of the displacement sensor. Much of the available optical energy, therefore, is wasted.

The detection and use of both the reflected and transmitted beams from the optically-resonant cavity, as in the present invention, has several ramifications. First, the optical energy of one of the beams is not wasted, as in the prior art. As a result, the signal strength is higher, which leads directly to an improved SNR. In addition, both the reflected and the transmitted signals are available for signal processing. In some embodiments, well-known signal processing methods are applied to a differential signal based on the two received signals. Rejection of common-mode noise components, such as relative intensity noise, enables a reduction in the noise component of the composite output signal, again improving SNR.

An embodiment of the present invention comprises: a first surface; a second surface, wherein said second surface and said first surface are substantially parallel and form an optically-resonant cavity having a cavity length, and wherein said cavity length varies in response to an acceleration; a first detector for generating a first electrical signal based on energy reflected by at least one of said first surface and said second surface; and a second detector for generating a second electrical signal based on energy that transits at least one of said first surface and said second surface; wherein the second surface and a proof mass are mechanically coupled, and wherein the proof mass has a physical adaptation that enables the proof mass to move in response to the acceleration.

DETAILED DESCRIPTION

The following terms are defined for use in this Specification, including the appended claims:

Cavity length means the instantaneous separation between two surfaces that form an optically-resonant cavity. Cavity length is fixed in the case of an optically-resonant etalon. Cavity length is variable in the case of an interferometer, such as a Fabry-Perot interferometer.

Mechanically-coupled means that one device is linked to another device such that movement of the one device affects the other device. For example, a motor and a mirror are mechanically-coupled if actuation of the motor causes motion of the mirror. This could be through direct contact, as in the case of two physically-coupled devices (e.g., a mirror that is mounted on a linear-motor); or through an intermediate medium (e.g., a mirror that is moved via a hydraulic force that is generated by a motor).

Operatively-coupled means that the operation of one device affects another device.

Physically-coupled means in direct, physical contact (e.g., a mirror that is mounted on a linear-motor).

Figure 1:
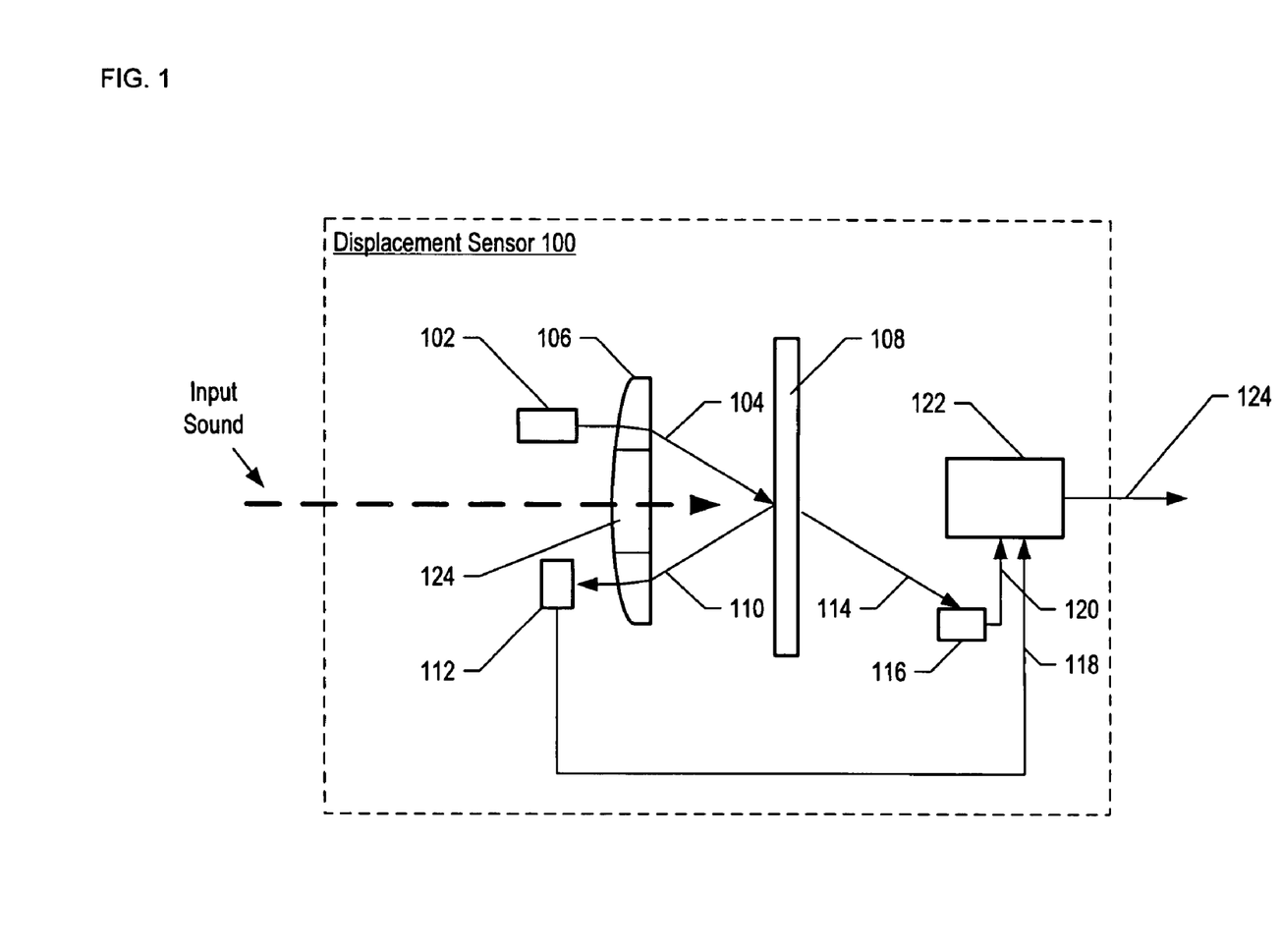
FIG. 1 depicts a schematic diagram of the salient components of a displacement sensor according to a first illustrative embodiment of the present invention.

FIG. 1 depicts a schematic diagram of the salient components of a displacement sensor according to a first illustrative embodiment of the present invention. Displacement sensor 100 comprises source 102, lens 106, Fabry-Perot interferometer 108, detector 112, detector 116, and processor 122. Displacement sensor 100 is an example of a displacement sensor of the type disclosed in the parent case of the instant application, co-pending U.S. patent application Ser. No. 11/366,730 filed Mar. 2, 2006. In the embodiment depicted in FIG. 1, the displacement sensor is configured for conversion of incident acoustic energy into electrical signal 124.

Source 102 is a laser diode capable of emitting monochromatic light at 850 nanometers (nm) with a spectral-width of less than ten (10) nanometers, and preferably less than three (3) nanometers. In some embodiments of the present invention, source 102 comprises a light-emitting diode. In still some other embodiments, source 102 comprises a super-luminescent light-emitting diode. In still some other embodiments of the present invention, source 102 comprises a narrow-wavelength-band filter that reduces the spectral bandwidth of source 102.

Lens 106 is a plano-convex lens that is suitable for collimating light emitted by a source 102 in well-known fashion. Lens 106 includes access hole 124, which facilitates the propagation of acoustic energy toward Fabry-Perot interferometer 108. In some embodiments, lens 106 does not include access hole 124. Lens 106 is aligned to source 102 such that the output of source 102 is received off the central axis of lens 106. Lens 106 collimates the output of source 102 into optical beam 104 and directs optical beam 104 toward the focal point of lens 106. Lens 106 also receives reflected beam 110 from Fabry-Perot interferometer 108 and focuses the optical energy of reflected beam 110 toward detector 112.

In some embodiments of the present invention, lens 106 is not present. In these embodiments, source 102 comprises a collimating lens and a non-orthogonal angle is formed by the direction of propagation of the output of source 102 and Fabry-Perot interferometer 108.

Fabry-Perot interferometer 108 is a variable-reflectivity optical element that comprises two partially-reflective surfaces that are separated from one another. The two surfaces define an optically-resonant cavity, which is characterized by a cavity length. Fabry-Perot interferometer receives optical beam 104 and splits it into reflected beam 110 and transmitted beam 114. The ratio of optical energy in reflected beam 110 and transmitted beam 114 is a function of the cavity length of Fabry-Perot interferometer 108. As will be described below, and with respect to FIG. 2, one surface of Fabry-Perot interferometer 108 is located on a movable membrane that is suitable for motion in response to incident acoustic energy. The cavity length of Fabry-Perot interferometer 108, therefore, is a function of received acoustic energy. As a result, the ratio of optical energy in reflected beam 110 and transmitted beam 114 is a function received acoustic energy.

Detectors 112 and 116 are photodetectors sensitive to the wavelength of the output light from source 102. Each of detectors 112 and 116 measure the intensity of the light that is incident on it and transmits an electrical signal indicative of that intensity to processor 122. It will be clear to those skilled in the art, after reading this specification, how to make and use detectors 112 and 116. Detector 112 receives reflected beam 110 and detector 116 receives transmitted beam 114.

Processor 122 is a general-purpose processor that is capable of reading data and instructions from a memory, of executing instructions, of writing data to a memory, of receiving data from detectors 112 and 116, and of providing electrical signal 104 to signal processor 106. Processor 122 receives electrical signals 118 and 120 and performs signal processing based on those signals. It will be clear to those skilled in the art, after reading this specification, how to make and use processor 122.

In some embodiments of the present invention, processor 122 comprises analog circuitry, such as a closed-loop feedback circuit, for reducing noise-derived contributions to electrical signal 104.

Figure 2:
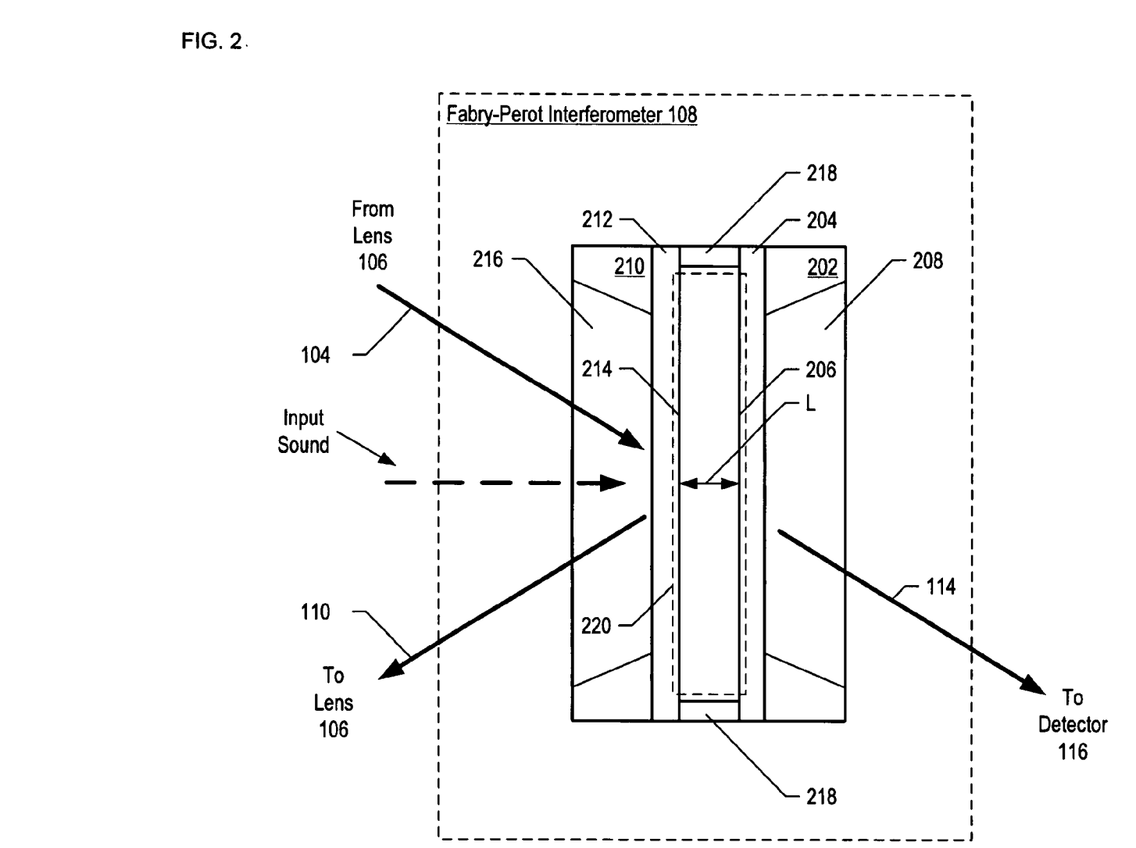
FIG. 2 depicts a cross-sectional view of the salient components of a Fabry-Perot interferometer according to the first illustrative embodiment of the present invention.

FIG. 2 depicts a cross-sectional view of the salient components of a Fabry-Perot interferometer according to the first illustrative embodiment of the present invention. Fabry-Perot interferometer 108 comprises substrate 202, layer 204, substrate 210, layer 212, and spacers 218. Fabry-Perot interferometer 108 receives optical beam 104 from lens 106 and splits the optical energy of optical beam 104 into reflected beam 110 and transmitted beam 114. The ratio of optical energy in reflected beam 110 and transmitted beam 114 is dependent upon the characteristics of optically-resonant cavity 220, as will be described below. Optically-resonant cavity 220 is formed by a surface 206 of layer 204 and surface 214 of layer 212, which are separated by cavity length L.

Substrate 202 is a 500 micron-thick silicon wafer. Substrate 202 provides a mechanical platform for layer 204. Substrate 202 comprises access hole 208, which removes silicon from the path of light beam 114 in order to reduce absorption of optical energy by substrate 202. By virtue of access hole 208, layer 204 is a movable membrane. In some embodiments of the present invention, substrate 202 is a material other than silicon. Suitable materials for substrate 202 include, without limitation, glass, III-V compound semiconductors, II-VI compound semiconductors, ceramics, and germanium. In some embodiments of the present invention, substrate 202 does not include access hole 208.

Layer 204 is a layer of material that is translucent for a wavelength of light that composes optical beam 104. Layer 204 is approximately $n*\lambda/4$-thick, where $\lambda$ is the wavelength (within layer 204) of light provided by source 102 and n is an odd-integer. Layer 204 comprises surface 206, which composes one surface of optically-resonant cavity 220. In some embodiments of the present invention, layer 204 comprises a 100 nm-thick layer of silicon-rich silicon nitride (SiRN). The thickness of layer 204 is determined so as to provide suitable performance of Fabry-Perot interferometer 108 for the wavelength of light provided by source 102. It will be appreciated by those skilled in the art that the distribution of optical energy into the reflected beam and transmitted beam is dependent upon the thickness and index of refraction of each of layers 204 and 212. In addition, it will be appreciated by those skilled in the art that thicknesses of layer 204 other than $\lambda/4$ can provide suitable performance, such as any odd-order of $\lambda/4$ (e.g., $3\lambda/4$, $5\lambda/4$, etc.). In some embodiments of the present invention, (e.g., wherein a different ratio of transmitted light to reflected light or different mechanical characteristics for layer 204 are desired) the thickness of layer 204 is approximately an even-order of $n*\lambda/4$ (e.g., $\lambda/2$, $\lambda$, $3\lambda/2$, etc.), and n is an even-integer. In still some other embodiments of the present invention, the thickness of layer 204 is made different than any order of $n*\lambda/4$ in order to compensate for a deviation from normal incidence of optical beam 104 at interferometer 108.

In the first illustrative embodiment of the present invention, substrate 210 is a 500 micron-thick silicon wafer. It will be clear to those skilled in the art, after reading this specification, how to make and use alternative embodiments of the present invention wherein substrate 210 has a thickness other than 500 microns. It will also be clear to those skilled in the art, after reading this specification, how to make and use alternative embodiments wherein substrate 210 comprises a material other than silicon. Substrate 210 provides a mechanical platform for layer 212. Substrate 210 comprises access hole 216, which removes silicon from the path of light beam 106 in order to reduce absorption of optical energy by substrate 210. By virtue of access hole 216, layer 212 is a movable membrane. In some embodiments of the present invention, substrate 210 is a material other than silicon. Suitable materials for substrate 210 include, without limitation, glass, metals, III-V compound semiconductors, II-VI compound semiconductors, ceramics, and germanium. In some embodiments of the present invention, substrate 210 does not include access hole 216. In some embodiments of the present invention, substrate 210 is not present. In some embodiments of the present invention, layer 212 and spacers 218 are disposed on substrate 202. In some embodiments of the present invention, layer 204 is not present and the optically-resonant cavity is formed by a surface of layer 212 and a surface of substrate 202.

Layer 212 is a layer of material that is translucent at the wavelength of light provided by source 102. The thickness of layer 212 is approximately $\lambda/4$, where $\lambda$ is the wavelength (within layer 212) of light provided by source 102. Layer 212 comprises surface 214, which composes one surface of optically-resonant cavity 220. In the illustrative embodiment of the present invention, layer 212 comprises a 100 nm-thick layer of SiRN. The thickness of layer 212 is determined so as to enable the desired ratio of reflectivity to transmissivity for Fabry-Perot interferometer 108 for the wavelength of light provided by source 102. It will be appreciated by those skilled in the art that other thicknesses of layer 212 can be used, such as any odd-order of $n*\lambda/4$, where n is an odd-integer (e.g., $3\lambda/4$, $5\lambda/4$, etc.). In some embodiments of the present invention, wherein it is desirable to substantially invert the ratio of reflectivity to transmissivity (from that of the illustrative embodiment), the thickness of layer 212 is approximately an order of $n*\lambda/2$, where n is an integer (e.g., $\lambda/2$, $\lambda$, $3\lambda/2$, etc.). In still some other embodiments of the present invention, the thickness of layer 204 is made different than any order of $n*\lambda/4$ in order to compensate for a deviation from normal incidence of optical beam 104 at interferometer 108.

Since, in some embodiments of the present invention, both reflected beam 106 and transmitted beam 114 are detected, greater tolerance to layer thickness variation is gained. In some embodiments of the present invention, therefore, the thicknesses of layers 204 and 212 can be substantially different than an even or odd order of $\lambda/4$. In some embodiments, the thickness of layer 204 is different than the thickness of layer 212.

In some embodiments of the present invention, at least one of layers 204 and 212 comprises a material other than SiRN. In still some other embodiments of the present invention, at least one of layers 204 and 212 comprises a plurality of layers of different materials. Suitable materials for use in layers 204 and 212 include, without limitation, silicon, silicon dioxide, silicon oxide (SiOx, where x is in the range of 0.1 to 4), titanium nitride, polysilicon, stoichiometric silicon nitride ($Si_3N_4$), III-V compound semiconductors, and II-VI compound semiconductors. In still some other embodiments of the present invention, the thickness of at least one of layers 204 and 212 is other than an even or odd order of $\lambda/4$. In still some other embodiments of the present invention, at least one of layers 204 and 212 comprises at least one through-hole to facilitate response of Fabry-Perot interferometer 108 to changes in pressure (e.g., in order to provide or avoid mechanical damping effects, etc.).

Spacers 218 are precision ceramic spacers that have a thickness of approximately 110 microns. The thickness of spacers 218 is determined so as to provide suitable performance of Fabry-Perot interferometer 108 for the wavelength of light provided by source 102. In some embodiments of the present invention, spacers 218 comprise silicon, and are formed by etching away a silicon wafer that interposes layers 204 and 212. In still some other embodiments, spacers 218 comprise a material other than ceramic or silicon. Suitable materials for spacers 218 include, without limitation, metals, epoxies, solder, silicon dioxide, glass, alumina, III-V compound semiconductors, and II-VI compound semiconductors. Although the illustrative embodiment comprises spacers that have a thickness of approximately 110 microns, it will be clear to those skilled in the art, after reading this specification, how to make and use alternative embodiments of the present invention that comprises spacers that have a thickness of other than 110 microns.

Optically-resonant cavity 220 comprises surface 206 and surface 214, which are separated by cavity-length L. In the absence of a pressure differential across the thickness of either layer 204 or 212, cavity-length L is equal to the thickness of space 218. In the presence of a pressure differential (e.g., due to incident acoustic energy) across its thickness, however, the movable membrane portion of layer 204 moves and thereby changes cavity length L. Those skilled in the art will appreciate that the reflection and transmission characteristics of an optically-resonant cavity is dependent upon its cavity length.

Figure 3:
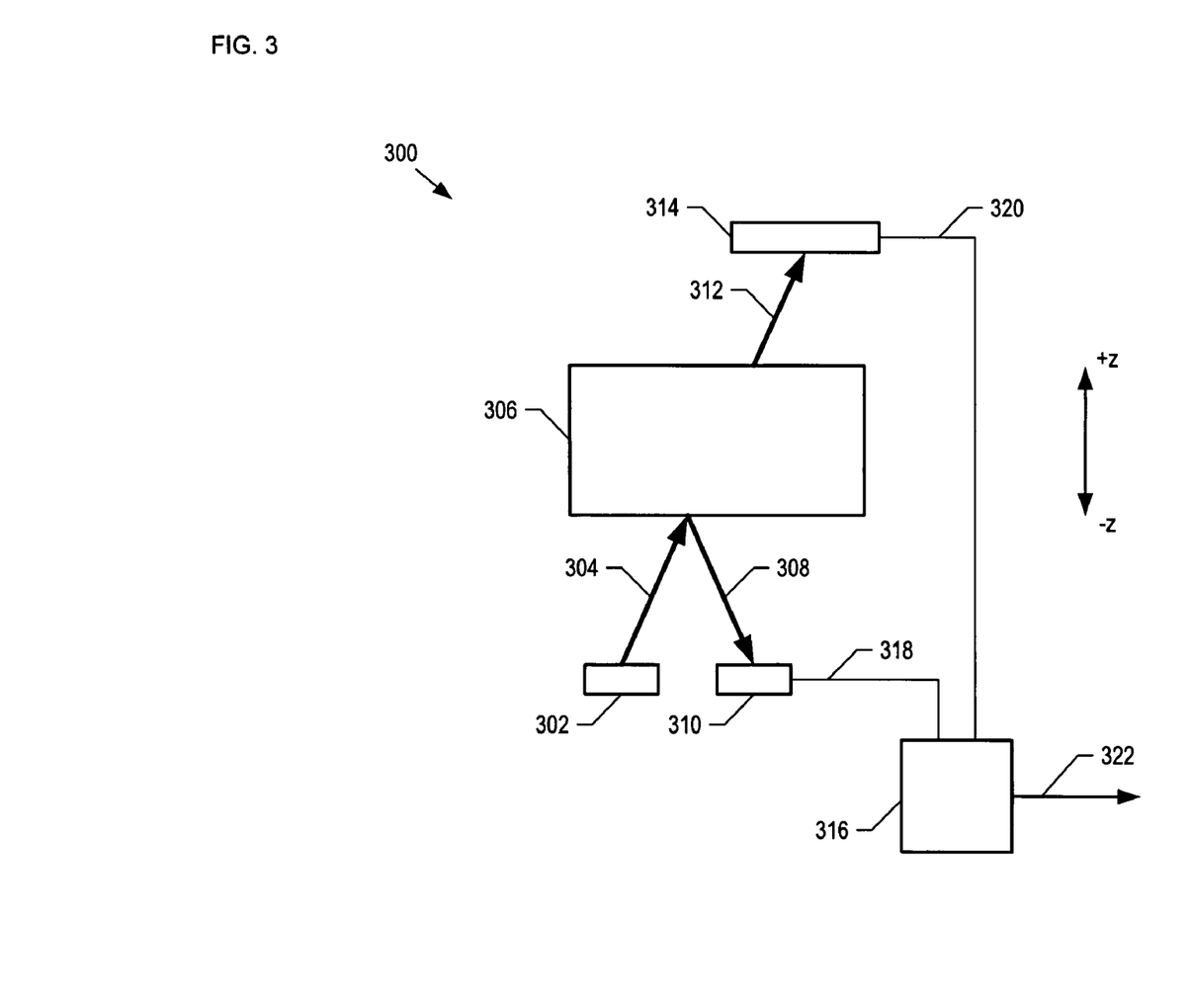
FIG. 3 depicts a schematic diagram of details of an accelerometer in accordance with a second illustrative embodiment of the present invention.

FIG. 3 depicts a schematic diagram of details of an accelerometer in accordance with a second illustrative embodiment of the present invention. Accelerometer 300 comprises source 302, acceleration sensor 306, photodetectors 310 and 314, and processor 316.

In typical operation of accelerometer 300, acceleration sensor 306 receives input light signal 304 from source 302. In some embodiments, a collimating lens forms the light from source 302 into a collimated beam prior to the light being received by acceleration sensor 306. Acceleration sensor 306 distributes the light into reflected beam 308 and transmitted beam 312. The ratio of the light contained in reflected beam 308 and transmitted beam 312 is based on an acceleration of acceleration sensor 306 along the z-direction, as described below and with respect to FIGS. 4A, 4B and 5.

Photodetector 310 receives reflected beam 308 and provides electrical signal 318 to processor 316. In similar fashion photodetector 314 receives transmitted beam 312 and provides electrical signal 320 to processor 316. Processor 316 provides electrical output signal 322 based on the two received electrical signals 318 and 320.

The instantaneous values of electrical signals 318 and 320 are based on the instantaneous intensities of reflected beam 308 and transmitted beam 312, respectively.

Figure 4A:
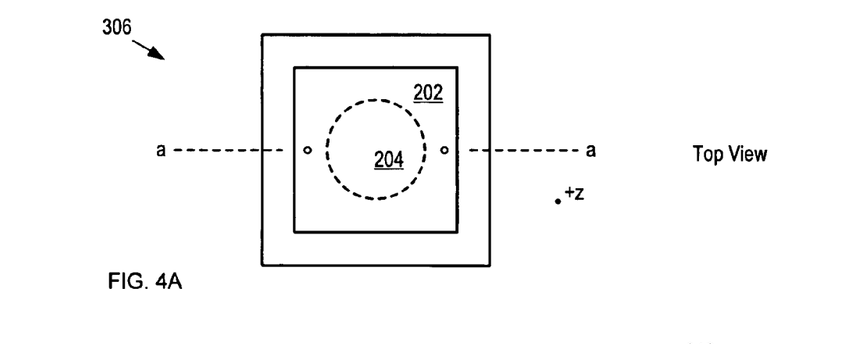
FIG. 4A depicts a schematic diagram of a top view of an acceleration sensor in accordance with the illustrative embodiment of the present invention.
Figure 4B:
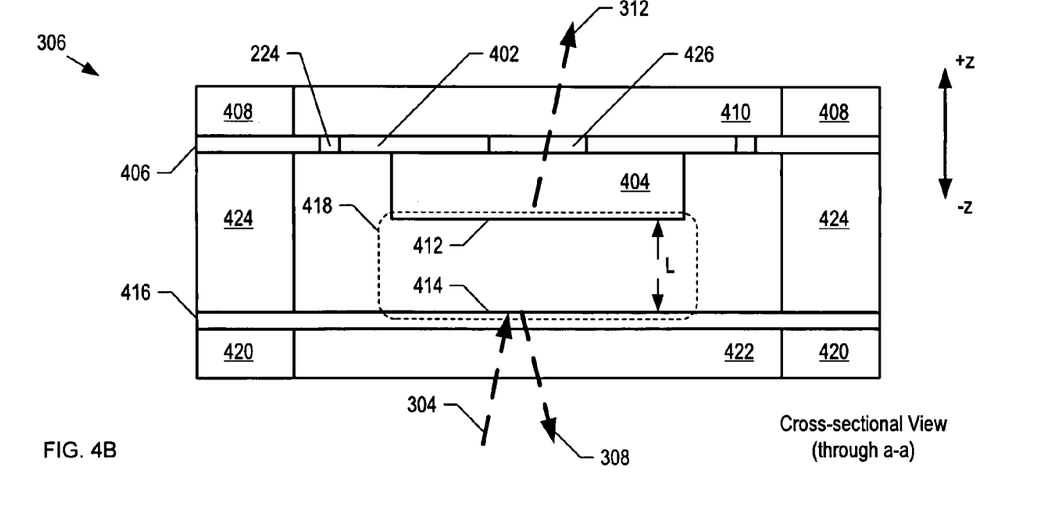
FIG. 4B depicts a schematic diagram of a cross-sectional view of an acceleration sensor in accordance with the second illustrative embodiment of the present invention.

FIGS. 4A and 4B depict a schematic diagram of a top view and cross-sectional view, respectively, of an acceleration sensor in accordance with the second illustrative embodiment of the present invention. Acceleration sensor 306 senses acceleration by virtue of an optically resonant cavity, wherein the cavity length of the optically resonant cavity is based on an acceleration component along its z-direction (as shown in FIG. 4B). Acceleration sensor 306 comprises: membrane 402, which is supported by substrate 408; proof mass 404, which is mechanically coupled to membrane 402; layer 416, which is supported by substrate 420; spacers 424, and proof mass 404. Surface 412 of proof mass 404 and surface 414 of layer 416 collectively define optically resonant cavity 418. At any instant in time, surfaces 412 and 414 are separated by instantaneous cavity length, L.

Figure 5:
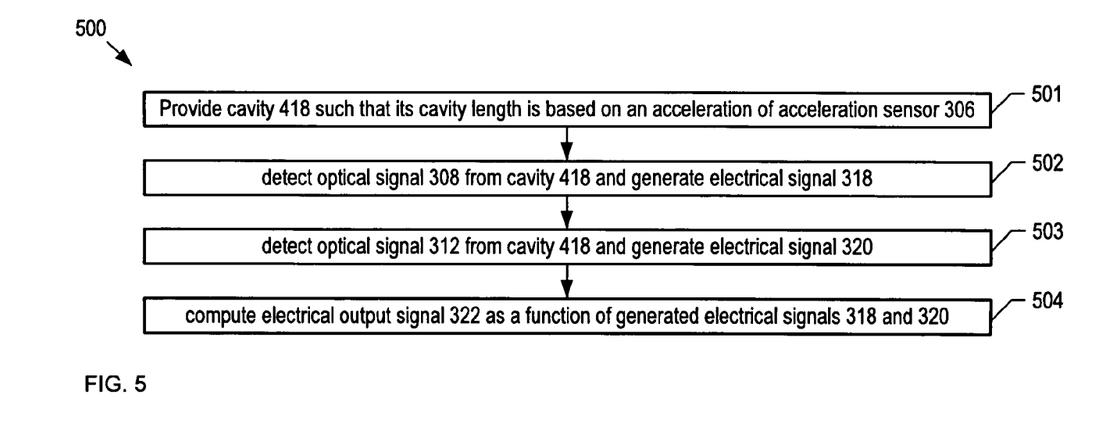
FIG. 5 depicts a method for detecting acceleration in accordance with the second illustrative embodiment of the present invention.

FIG. 5 depicts a method for detecting acceleration in accordance with the second illustrative embodiment of the present invention. Method 500 will be described with continuing reference to FIGS. 3, 4A, and 4B.

Method 500 begins with operation 501, wherein an optically resonant cavity whose cavity length is based on an acceleration is provided. Optically resonant cavity 418 is defined by surface 412 of proof mass 404 and surface 414 of layer 416. As acceleration sensor 306 is affected by an acceleration component along the z-direction, the resultant force exerted on proof mass 404 induces it to move either toward or away from surface 414. As a result, the distance between surfaces 412 and 414 (i.e., cavity length, L) changes. Proof mass 414, therefore, provides dual functionality: (1) a proof mass for acceleration sensor 306; and (2) a mirror that is partially reflective for light contained in input light signal 304. In some embodiments, membrane 402 comprises a proof mass and, therefore, a discrete proof mass is not required. In some embodiments, a surface of membrane 402 comprises one of the surfaces that define an optically resonant cavity.

Proof mass 414 is a 1 mm by 1 mm square block of glass that has a thickness of 0.5 mm. Proof mass 414 comprises a glass that is suitable for transmission of light contained in input light signal 304. Examples of glass suitable for use in proof mass 414 include, without limitation, borosilicate glass, fused silica, high-dielectric constant glasses, and the like.

Surface 412 comprises a conventional multi-layer dielectric mirror that is partially reflective for light contained in input light signal 304. In some alternative embodiments, a different mirror layer is disposed on surface 412. Suitable materials for forming a partially reflective surface 412 include, without limitation, metals, dielectrics, polyimides, semiconductors, and the like. The upper surface (as shown) of proof mass 414 comprises a layer that is substantially non-reflective for light contained in input optical signal 304.

Proof mass 414 is mechanically attached to membrane 402, which is a portion of layer 406. Layer 406 comprises a layer of single-crystal silicon having a thickness of approximately 1000 nanometers. The mechanically active region of layer 406 that defines membrane 402 is formed by the formation of cavity 410 in substrate 408. Membrane 402 comprises optional access hole 426, which facilitates the propagation of transmitted signal 312.

In some alternative embodiments, layer 406 comprises one or more layers of different materials of suitable thickness for forming membrane 404. Suitable materials for use in layer 406 include, without limitation: metals; dielectrics, such as silicon nitrides, silicon oxides, silicon oxynitrides, silicon carbides; ceramics; polymers; and semiconductors, such as polysilicon, germanium, III-V compound semiconductors, II-VI compound semiconductors; and the like. In some embodiments, layer 406 comprises a thin sheet of material that is disposed on, or attached to, substrate 408 after the formation of cavity 410. Membrane 402 comprises optional through-holes 424 to facilitate motion of membrane 402 (e.g., to provide or avoid mechanical damping effects, etc.). The number and placement of through-holes 424 is a matter of design choice.

Layer 416 is a layer of silicon nitride having a thickness of 100 nanometers. Layer 416 is disposed on substrate 420, which is a conventional silicon wafer having a thickness of approximately 500 microns. Substrate 420 comprises optional cavity 422. By virtue of cavity 422, the mechanically active portion of layer 416 is also a membrane; however, since layer 416 is not mechanically coupled to a proof mass its movement due to acceleration is negligible. In some embodiments, cavity 422 is not included. In some embodiments, layer 416 is a second block of glass having a thin-film partially reflective mirror layer on surface 414 and an anti-reflection coating on its opposing surface (i.e., the lower surface as shown in FIG. 4B), in similar fashion to proof mass 404.

Spacers 424 are precision mechanical spacers that facilitate the formation of optically resonant cavity 418 with a desired separation between layers 406 and 416. This separation between layers 406 and 416 sets the initial cavity length for optically resonant cavity 418. In some embodiments, one of substrates 408 and 420 is used as a spacer that determines the separation between layers 406 and 416. In some embodiments, spacers 424 comprise a housing that accepts and seats substrates 408 and 420 and layers 406 and 416.

Cavity length, L, is dependent upon the position of proof mass 404 relative to surface 414. When acceleration sensor 306 is subjected to an acceleration component along the z-direction proof mass 404 moves relative to surface 414. As a result, instantaneous cavity length, L, varies based upon this acceleration.

As cavity length, L, changes with the motion of proof mass 404, the reflectivity and transmissivity of optically resonant cavity 418 also changes. The distribution of optical energy into each of reflected signal 308 and transmitted signal 312, therefore, also changes as a function of the acceleration of acceleration sensor 306.

At operation 502, photodetector 310 detects reflected signal 308 and generates electrical signal 318. Electrical signal 318 is a function of the intensity of the light in reflected signal 308. Electrical signal 318 is provided to processor 316 by photodetector 310.

At operation 503, photodetector 314 detects reflected signal 312 and generates electrical signal 320. Electrical signal 320 is a function of the intensity of the light in transmitted signal 312. Electrical signal 320 is provided to processor 316 by photodetector 314.

At operation 504, processor 316 generates output electrical signal 322. Output electrical signal 322 is based upon electrical signal 318 and 320. In some embodiments, processor 316 utilizes signal processing techniques to reduce contributions from noise sources such as relative intensity noise, and white noise. It will be clear to those skilled in the art, after reading this specification, how to make and use embodiments of the present invention that utilize signal processing techniques to reduce noise-derived contributions to the electrical output signal.

In addition, the signal strength of electrical signal 322 is increased due to the fact that nearly all of the optical power received by optically resonant cavity 418 is detected and converted to electrical signal by the combination of detectors 310 and 314. Processor 316, therefore, is capable of enhancing the signal strength of electrical signal 322. The combination of enhanced signal strength and reduced noise leads to a significant increase in SNR for electrical signal 322. In some embodiments of the present invention, processor 316 utilizes analog signal conditioning techniques to reduce noise-derived contributions to electrical signal 322. It will be clear to those skilled in the art, after reading this specification, how to make and use embodiments of the present invention that utilize such analog signal conditioning techniques.

Figure 6A:
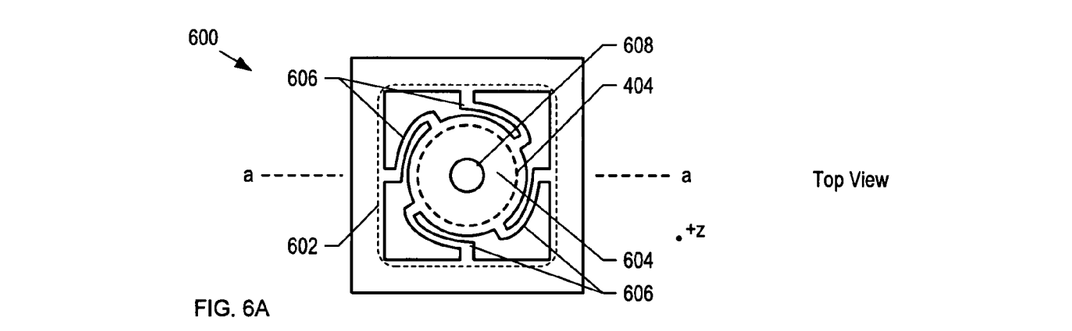
FIG. 6A depicts a schematic drawing of a top view of an acceleration sensor in accordance with a first alternative embodiment of the present invention.
Figure 6B:
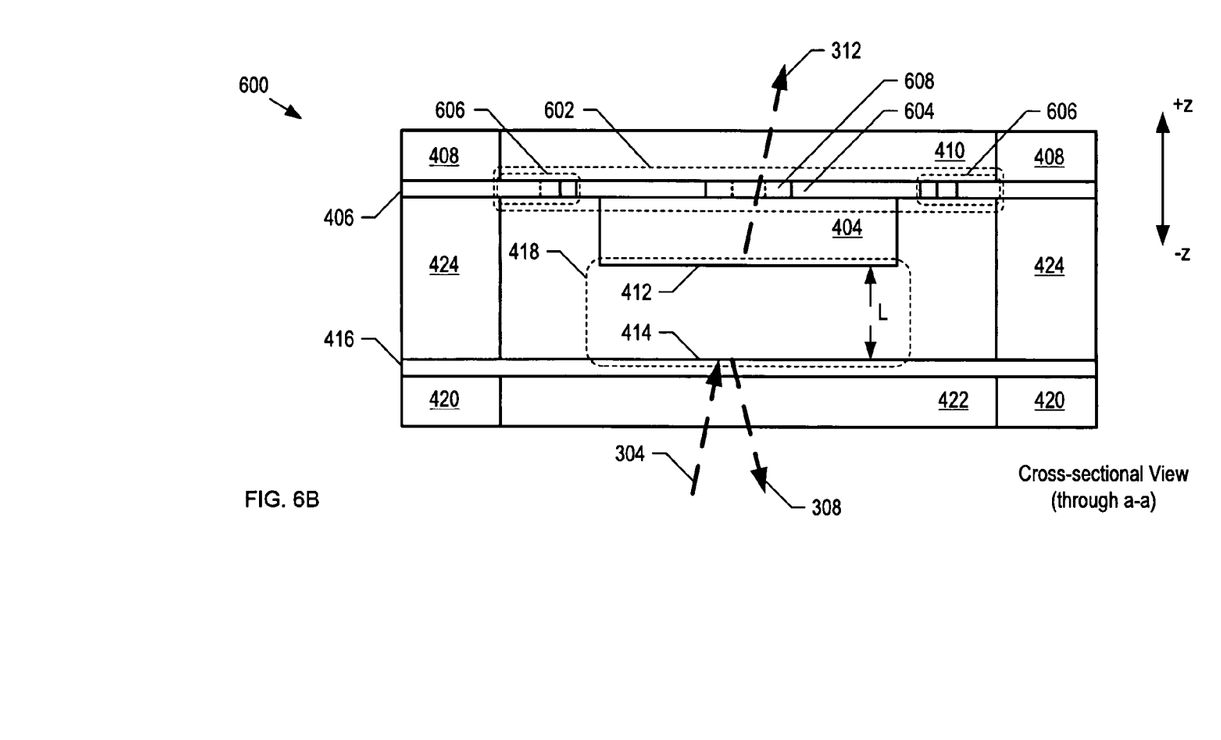
FIG. 6B depicts a schematic drawing of a cross-sectional view of an acceleration sensor in accordance with a first alternative embodiment of the present invention.

FIGS. 6A and 6B depict a schematic drawing of a top view and cross-sectional view, respectively, of an acceleration sensor in accordance with a first alternative embodiment of the present invention. In operation, acceleration sensor 600 is analogous to acceleration sensor 306.

Figure 7:
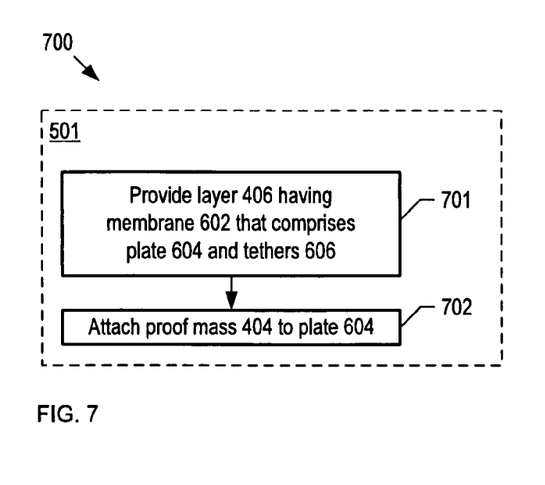
FIG. 7 depicts a method comprising sub-operations for forming a membrane as part of operation 501 of method 500, in accordance with the first alternative embodiment.

FIG. 7 depicts a method comprising sub-operations for forming a membrane as part of operation 501 of method 500, in accordance with the first alternative embodiment. Method 700 is described herein with continuing reference to FIGS. 6A and 6B.

Method 700 begins with operation 701 wherein layer 610, which comprises membrane 602 is provided. Layer 610 is a layer of metal that is stamped, cast, etched, or photoetched to form plate 604 and tethers 606. Plate 604 and tethers 606 collectively define membrane 602. The four tethers 606 collectively define a tether system for supporting plate 604 and proof mass 404. In the first alternative embodiment, plate 604 comprises optional through-hole 608, which mitigates attenuation of transmitted signal 312.

In some embodiments layer 610 is a layer of non-metallic material that is cast into its desired shape. Materials suitable for use in layer 610 include, without limitation, metals, ceramics, polymers, glasses, composite alloys, metallic alloys, graphite, and semiconductors.

In some embodiments, layer 610 is a layer deposited on substrate 408, in similar fashion to layer 406 described above.

At operation 702, proof mass 404 is attached to plate 604 in conventional fashion. In some alternative embodiments, proof mass 404 is formed as a continuous portion of proof mass 604 by forming tethers 606 to have a thickness that is less than the thickness of proof mass 604.

As plate 604 and proof mass 404 move in response to an acceleration of acceleration sensor 600, membrane stress and plate bending is concentrated in tethers 606. Although the first alternative embodiment comprises a tether system having four tethers, it will be clear to one of ordinary skill in the art, after reading this specification, how to make and use alternative embodiments of the present invention that comprise a tether system having any number of tethers. It will also be clear how to make and use alternative embodiments of the present invention wherein tethers have a shape other than that of tether 606 as depicted in FIGS. 6A and 6B.

Figure 8:
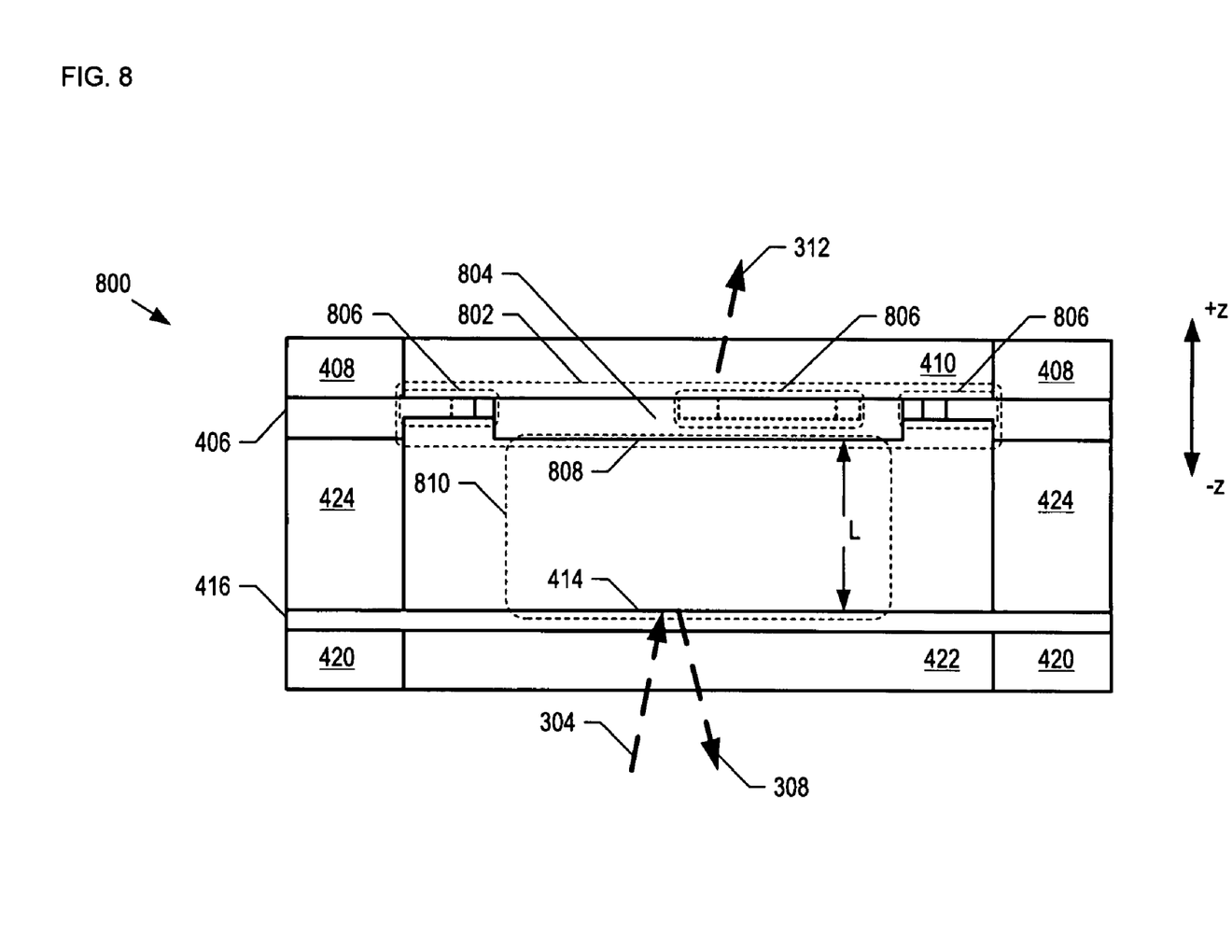
FIG. 8 depicts a schematic drawing of a cross-sectional view of an acceleration sensor in accordance with a second alternative embodiment of the present invention.

FIG. 8 depicts a schematic drawing of a cross-sectional view of an acceleration sensor in accordance with a second alternative embodiment of the present invention. In operation, acceleration sensor 800 is analogous to acceleration sensor 306.

Figure 9:
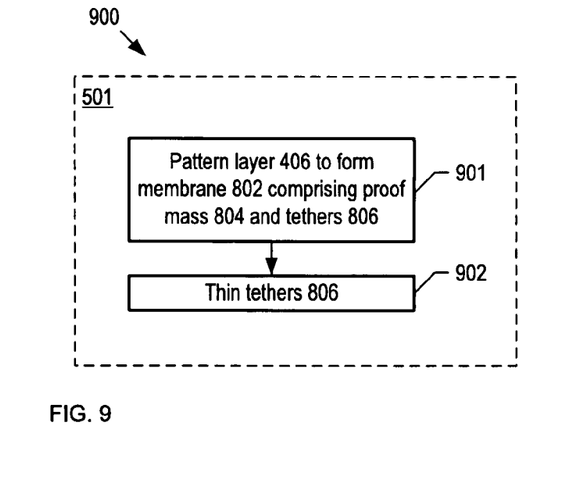
FIG. 9 depicts a method comprising sub-operations for forming a membrane as part of operation 501 of method 500, in accordance with the second alternative embodiment.

FIG. 9 depicts a method comprising sub-operations for performing operation 501 of method 500, in accordance with the second alternative embodiment. Method 900 is described herein with continuing reference to FIG. 8.

Method 900 begins with operation 901 wherein membrane 802 is formed. In order for form membrane 802, the mechanically active region of layer 406 is patterned to form proof mass 804 and tethers 806. The four tethers 806 collectively define a tether system for supporting proof mass 804.

As proof mass 804 moves in response to an acceleration of acceleration sensor 800, membrane stress and proof mass bending is concentrated in tethers 806. This enables proof mass 804 to remain substantially flat during operation. Once patterned, proof mass 804 and tethers 806 collectively define membrane 802. In some embodiments, layer 406 is patterned prior to the formation of cavity 410. In some embodiments, layer 406 is patterned after the formation of cavity 410.

At operation 902, tethers 806 are thinned to create a thickness difference between tethers 806 and proof mass 804. In some embodiments, tethers 806 are thinned prior to the formation of cavity 410. In some embodiments, tethers 806 are thinned after the formation of cavity 410.

Surfaces 808 and 414 collectively define optically resonant cavity 810, having cavity length, L, which varies based on acceleration sensor 800 being subjected to an acceleration component along the z-direction.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. An apparatus comprising:
   a first surface;
   a second surface, wherein said second surface and said first surface are substantially parallel and form an optically-resonant cavity having a cavity length, and wherein said cavity length varies in response to an acceleration;
   a first detector for generating a first electrical signal based on energy reflected by at least one of said first surface and said second surface; and
   a second detector for generating a second electrical signal based on energy that transits at least one of said first surface and said second surface;
   wherein the second surface and a proof mass are mechanically coupled, and wherein the proof mass has a physical adaptation that enables the proof mass to move in response to the acceleration.

2. The apparatus of claim 1 wherein the physical adaptation comprises a membrane having a shape that defines the proof mass and a tether system having at least one tether.

3. The apparatus of claim 2 wherein the proof mass and at least one tether have a different thickness.

4. The apparatus of claim 1 wherein the second surface is a surface of the proof mass.

5. The apparatus of claim 1 further comprising a source for emitting the energy.

6. The apparatus of claim 1 wherein the second surface is a surface of a mirror that is at least partially reflective for the energy, and wherein the mirror and the proof mass are mechanically coupled.

7. The apparatus of claim 1 wherein the physical adaptation comprises a proof mass and a tether system for enabling motion of the proof mass, and wherein the second surface is a surface of a mirror that is at least partially reflective for the energy, and further wherein the mirror and the proof mass are mechanically coupled.

8. The apparatus of claim 1 wherein the proof mass comprises the second surface and wherein the physical adaptation comprises a membrane, wherein the proof mass and the membrane are physically coupled.

9. An apparatus comprising:
a source for providing optical energy;
a Fabry-Perot interferometer for receiving the optical energy and distributing the optical energy into reflected optical energy and transmitted optical energy, wherein the Fabry-Perot interferometer comprises a first surface and a second surface, and wherein the second surface and a movable membrane are mechanically coupled;
a first detector for detecting at least a portion of the reflected optical energy; and
a second detector for detecting at least a portion of the transmitted optical energy;
wherein the cavity length of the Fabry-Perot interferometer varies in response to an acceleration.

10. The apparatus of claim 9 wherein the movable membrane is shaped to define a proof mass and a tether system having at least one tether.

11. The apparatus of claim 10 wherein the second surface is a surface of a mirror that is partially reflective for the optical energy.

12. The apparatus of claim 11 wherein the mirror comprises a layer that is disposed on a surface of the proof mass.

13. The apparatus of claim 11 wherein the mirror and the proof mass are physically coupled.

14. The apparatus of claim 13 wherein the mirror and proof mass are bonded together.

15. The apparatus of claim 9 wherein the second surface is a surface of the movable membrane.

16. A method for sensing an acceleration comprising:
providing an optically resonant cavity comprising a first surface and a second surface, wherein the optically resonant cavity has a cavity length that is based on the position of a proof mass, and further wherein the position of the proof mass is based on an acceleration;
receiving input optical energy at the optically resonant cavity;
distributing the input optical energy into a reflected signal and a transmitted signal, wherein the ratio of optical energy in the reflected signal and transmitted signal is based on the cavity length;
generating a first electrical signal based on the reflected signal; and
generating a second electrical signal based on the transmitted signal.

17. The method of claim 16 further comprising computing a third electrical signal, wherein the third electrical signal is based on the first electrical signal and the second electrical signal.

18. The method of claim 16 further comprising providing a shaped membrane, wherein the shaped membrane comprises the proof mass.

19. The method of claim 16 further comprising providing the second surface as a surface of a mirror that is at least partially reflective for the input optical energy, wherein the mirror and the proof mass are mechanically coupled.

* * * * *